United States Patent
Nelson (10) Patent No.: US 8,658,916 B2
(45) Date of Patent: Feb. 25, 2014

(54) SNOW SHIELD FOR A TRUCK SCALE

(76) Inventor: Denis L. Nelson, Council Bluffs, IA (US)

(*) Notice: Subject to any disclaimer, the term of this patent is extended or adjusted under 35 U.S.C. 154(b) by 378 days.

(21) Appl. No.: 13/135,430

(22) Filed: Jul. 5, 2011

(65) Prior Publication Data

US 2013/0008728 A1 Jan. 10, 2013

(51) Int. Cl.
*G01G 19/02* (2006.01)
*E04B 1/34* (2006.01)

(52) U.S. Cl.
USPC ...... 177/134; 177/135; 52/3; 52/4; 135/120.1

(58) Field of Classification Search
USPC .................. 177/134, 135; 52/3–5; 135/120.1–120.4, 115, 119, 90; 296/100.04
See application file for complete search history.

(56) References Cited

U.S. PATENT DOCUMENTS

| | | | | |
|---|---|---|---|---|
| 3,266,584 A * | 8/1966 | Lee | | 177/134 |
| 3,494,658 A * | 2/1970 | Maes, Jr. | | 296/100.15 |
| 3,533,481 A * | 10/1970 | Paelian | | 177/134 |
| 3,957,069 A * | 5/1976 | Denaro | | 135/118 |
| 3,970,096 A * | 7/1976 | Nicolai | | 135/94 |
| 4,210,216 A * | 7/1980 | Godden | | 177/134 |
| 4,266,624 A * | 5/1981 | Nordstron et al. | | 177/134 |
| 4,285,412 A | 8/1981 | Wirth | | |
| RE30,774 E * | 10/1981 | Dahlbeck et al. | | 4/498 |
| 4,729,443 A * | 3/1988 | Iadarola | | 177/135 |
| 4,750,577 A * | 6/1988 | Hafner | | 177/135 |
| 5,080,123 A * | 1/1992 | Stein | | 135/97 |
| 5,413,340 A * | 5/1995 | Potvin et al. | | 273/127 B |
| 5,738,130 A * | 4/1998 | Thomas | | 135/88.13 |
| 7,100,625 B2 * | 9/2006 | Valles | | 135/88.13 |
| 2004/0194393 A1 * | 10/2004 | Horman | | 52/3 |
| 2005/0194029 A1 * | 9/2005 | Goldwitz | | 135/98 |
| 2008/0283809 A1 * | 11/2008 | Hoffman, Jr. | | 256/23 |
| 2013/0008727 A1 * | 1/2013 | Nelson | | 177/133 |

* cited by examiner

*Primary Examiner* — Randy W Gibson
(74) *Attorney, Agent, or Firm* — Dennis L. Thomte; Thomte Patent Law Office LLC (57) ABSTRACT

A snow shield for a truck scale for covering the gap between the lower side of the scale deck of the truck scale and a support surface at each side of the truck scale. A first flexible sheet member has its upper end secured to the outer side of the first frame siderail of the truck scale for the length thereof and extends downwardly therefrom outwardly of the gap at one side of the truck scale. A second flexible sheet member has its upper end secured to the outer side of the second frame siderail of the truck scale for the length thereof and extends downwardly therefrom outwardly of the gap at the other side of the truck scale. The lower ends of the sheet members are secured in place to either the supporting surface or the ground adjacent thereto.

14 Claims, 8 Drawing Sheets

SNOW SHIELD FOR A TRUCK SCALE

BACKGROUND OF THE INVENTION

1. Field of the Invention

This invention relates to a snow shield for a truck scale and more particularly to a snow shield which is selectively removably secured to each of the sides of a truck scale to prevent snow from blowing thereinto between the scale deck and the supporting surface therebelow.

2. Description of the Related Art

Above-ground truck scales are normally comprised of an elongated, generally rectangular scale deck which is positioned above a supporting surface or foundation with a plurality of spaced-apart load cells being positioned between the foundation and the scale deck. In most of such installations, a gap is present at each side of a scale deck between the lower end of the scale deck and the upper end of the foundation.

During winter months, blowing snow may blow into the gap between the scale deck and the foundation and accumulate therebetween which may affect the accuracy of the scale. When snow does accumulate between the underside of the scale deck and the upper surface of the foundation, it is sometimes necessary to use long rakes or shovels in an attempt to remove the snow therefrom. The same is time consuming and it is possible that the shovels or rakes may strike the load cells and damage the same.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A snow shield is provided for a truck scale with the truck scale including a substantially horizontally disposed scale deck positioned above a supporting surface. The truck scale has an entry end, an exit end, a first side, a second side, an upper end and a lower end. A plurality of spaced-apart load cells are positioned between the scale deck and the supporting surface with the lower end of the scale deck being positioned above the supporting surface to create a gap at each of the first and second sides thereof. The scale deck has first and second longitudinally extending frame siderails at the first and second sides thereof. Each of the first and second frame siderails has a first end, a second end, inner and outer surfaces and upper and lower ends.

A first elongated flexible sheet member is provided having an upper end, a lower end, a first end, a second end, an inner side and an outer side. The upper end of the first sheet member is selectively detachably secured to the first frame siderail so that the first end thereof is positioned adjacent the first end of the first frame siderail and so that the second end thereof is positioned adjacent the second end of the first frame siderail. The first sheet member extends downwardly from its upper end to the supporting surface or to the ground adjacent thereto to cover the gap at the first side of the scale deck. The lower end of the first sheet member is operatively secured in place to prevent snow or the like from passing into the gap at the first side of the scale deck.

A second elongated flexible sheet member is also provided having an upper end, a lower end, a first end, a second end, an inner side and an outer side. The upper end of the second sheet member is secured to the second frame siderail so that the first end thereof is positioned adjacent the first end of the second frame siderail and so that the second end thereof is positioned adjacent the second end of the second frame siderail. The second sheet member extends downwardly from its upper end to the supporting surface or to the ground adjacent thereto to cover the gap at the second side of the scale deck. The lower end of the second sheet member is operatively secured in place to prevent snow from passing into the gap at the second side of the scale deck.

In the preferred embodiment, a plurality of horizontally spaced-apart and vertically extending supports, having upper and lower ends, are positioned outwardly of the first and second sides of the first and second frame siderails respectively with the first and second sheet members being selectively removably secured to the supports.

In the preferred embodiment, the lower ends of the first and second sheet members are selectively removably secured to the supporting surface or to the ground adjacent thereto.

In one embodiment, weights are placed on the lower ends of the first and second sheet members to hold the lower ends of the first and second sheet members in place.

In the preferred embodiment, the first and second ends of the first and second sheet members are selectively removably secured to the first ends of the first and second frame siderails respectively and the second ends of the first and second sheet members are selectively removably secured to the second ends of the first and second frame siderails respectively.

It is therefore a principal object of the invention to provide a snow shield for a truck scale.

A further object of the invention is to provide a snow shield which is positioned at the opposite sides of a truck scale to prevent snow from blowing into the gaps at the outer sides of the truck scale and the supporting surface or foundation.

A further object of the invention is to provide a snow shield of the type described which is selectively removably secured to opposite sides of the truck scale.

A further object of the invention is to provide a snow shield for a truck scale of the type described wherein the snow shield may be removed during the non-winter months.

Yet another object of the invention is to provide a snow shield for a truck scale of the type described which enables the scale deck to move with respect to the foundation without interference from the snow shields.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional truck scale which includes a scale deck 12 positioned above a supporting surface or foundation 14 in conventional fashion. A plurality of conventional load cells 16 extend between the foundation 14 and the scale deck 12 in conventional fashion. In many truck scales, a gap 18 is present between the underside of the scale deck 12 and the foundation 14 at each side of the truck scale 10. In blowing snow conditions, snow may blow through the gaps 18 and accumulate between the scale deck and the foundation.

For purposes of description, truck scale 10 will be described as having an entrance end 20, exit end 22, a first side 24, and a second side 26. An entrance ramp 28 is provided at the entrance end 20 of the truck scale 10 and an exit ramp 30 is provided at the exit end 22 of the truck scale.

Truck scale 10 includes a longitudinally extending frame siderail 32 at side 24 thereof and a longitudinally extending frame siderail 34 at side 26 thereof. Inasmuch as frame siderails 32 and 34 are identical, only side frame rail 32 will be described in detail. Siderail 32 includes an upper flange 36, a lower flange 38 and a web 40 extending therebetween. The height or distance between the upper and lower flanges of the siderail 32 will vary considerably from approximately 12 inches to approximately 24 inches. As seen in the drawings, depending upon the particular truck scale, a VELCRO® strip 42 is secured to the outer end of the lower flange 38 or a VELCRO® strip 44 is secured to the outer end of the upper flange 36. The VELCRO® strips will extend from one end of the frame siderails to the other end thereof. Other similar fastening systems may be employed.

Figure 1:
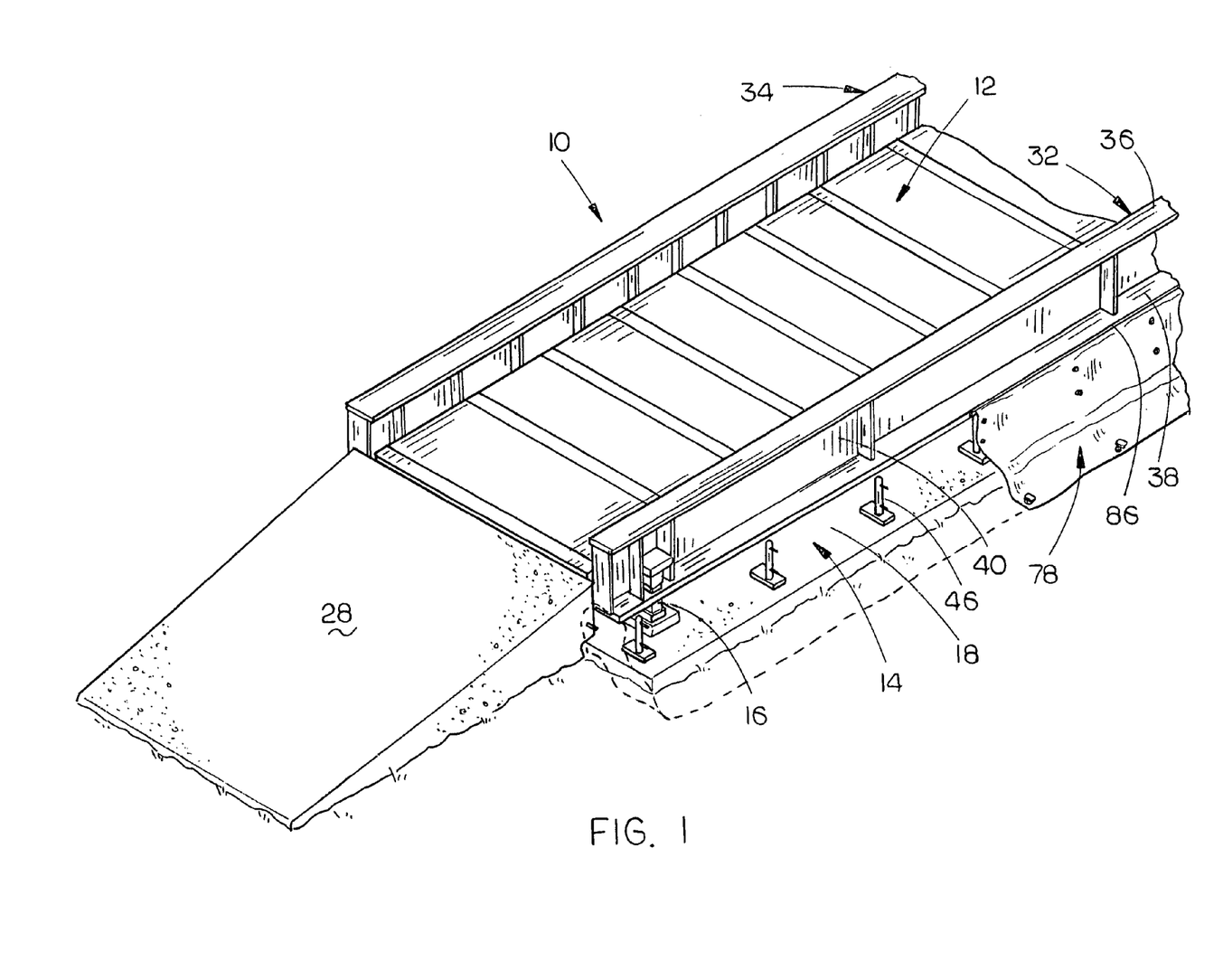
FIG. 1 is a partial perspective view of a truck scale having a portion of the snow shield secured to one side thereof.
Figure 2:
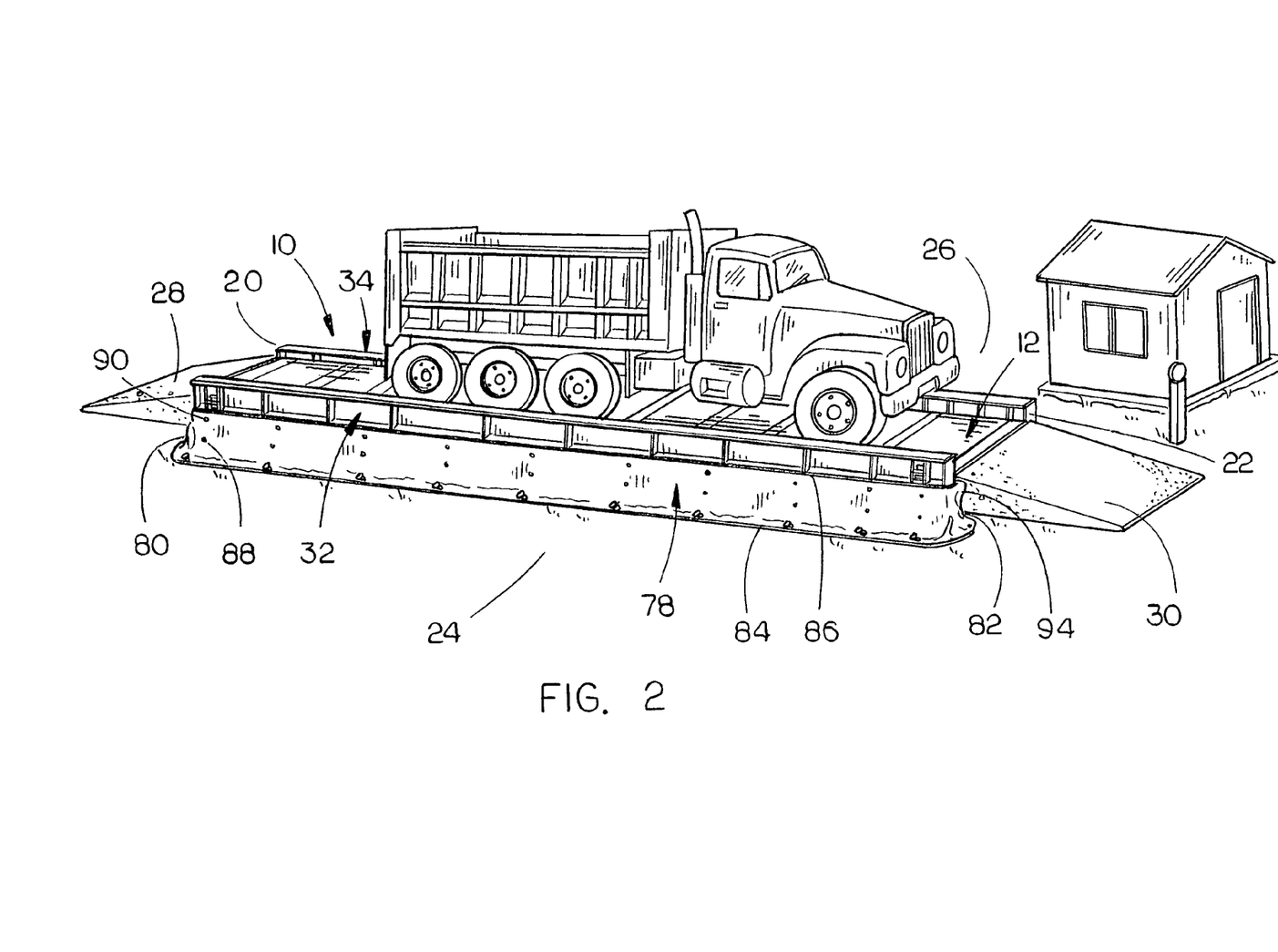
FIG. 2 is a perspective view of a truck scale having the snow shield of this invention secured to one side thereof.
Figure 3:
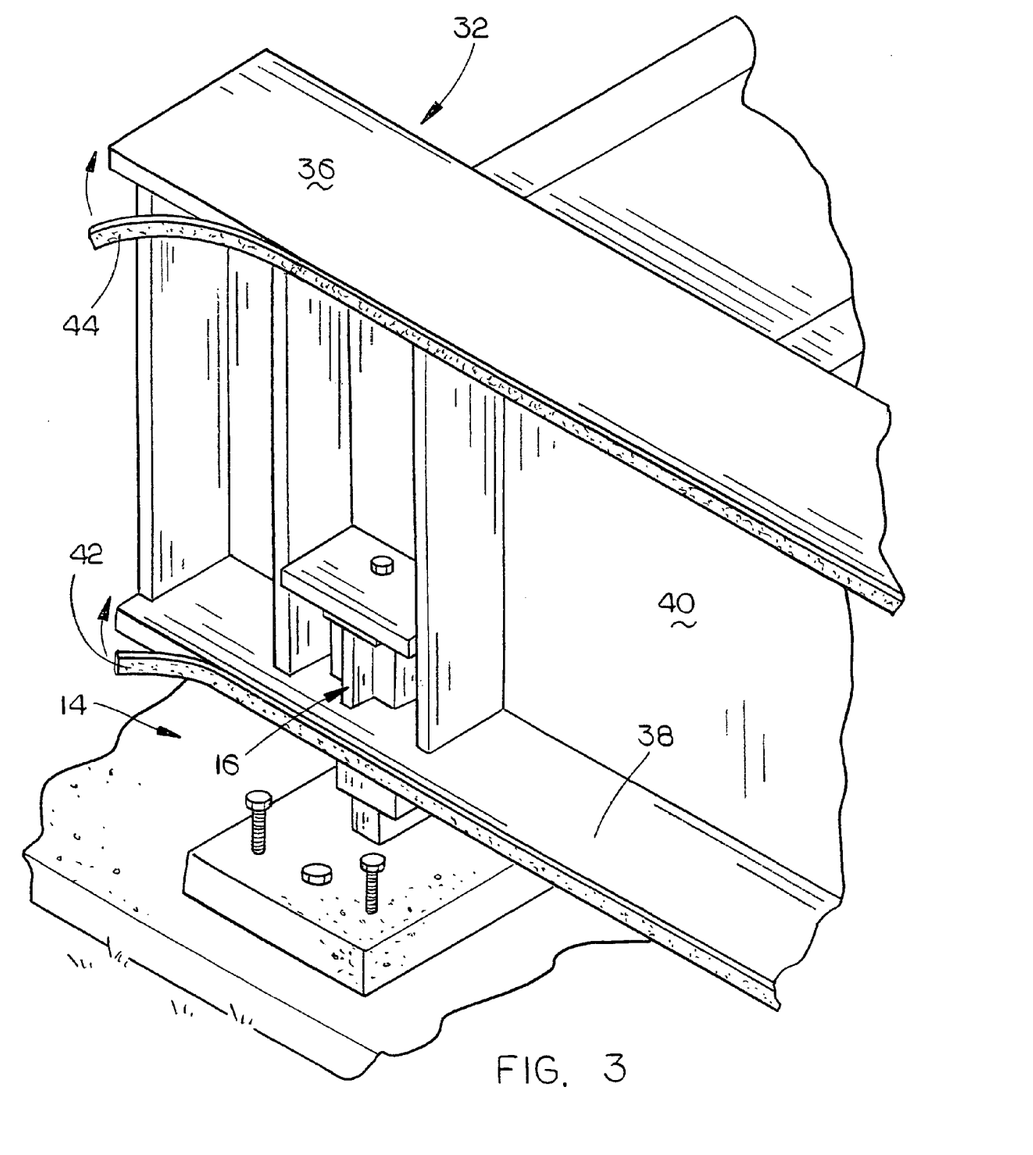
FIG. 3 is a partial perspective view illustrating the manner in which VELCRO® strips are secured to either the upper or lower flanges of one of the frame siderails.
Figure 7:
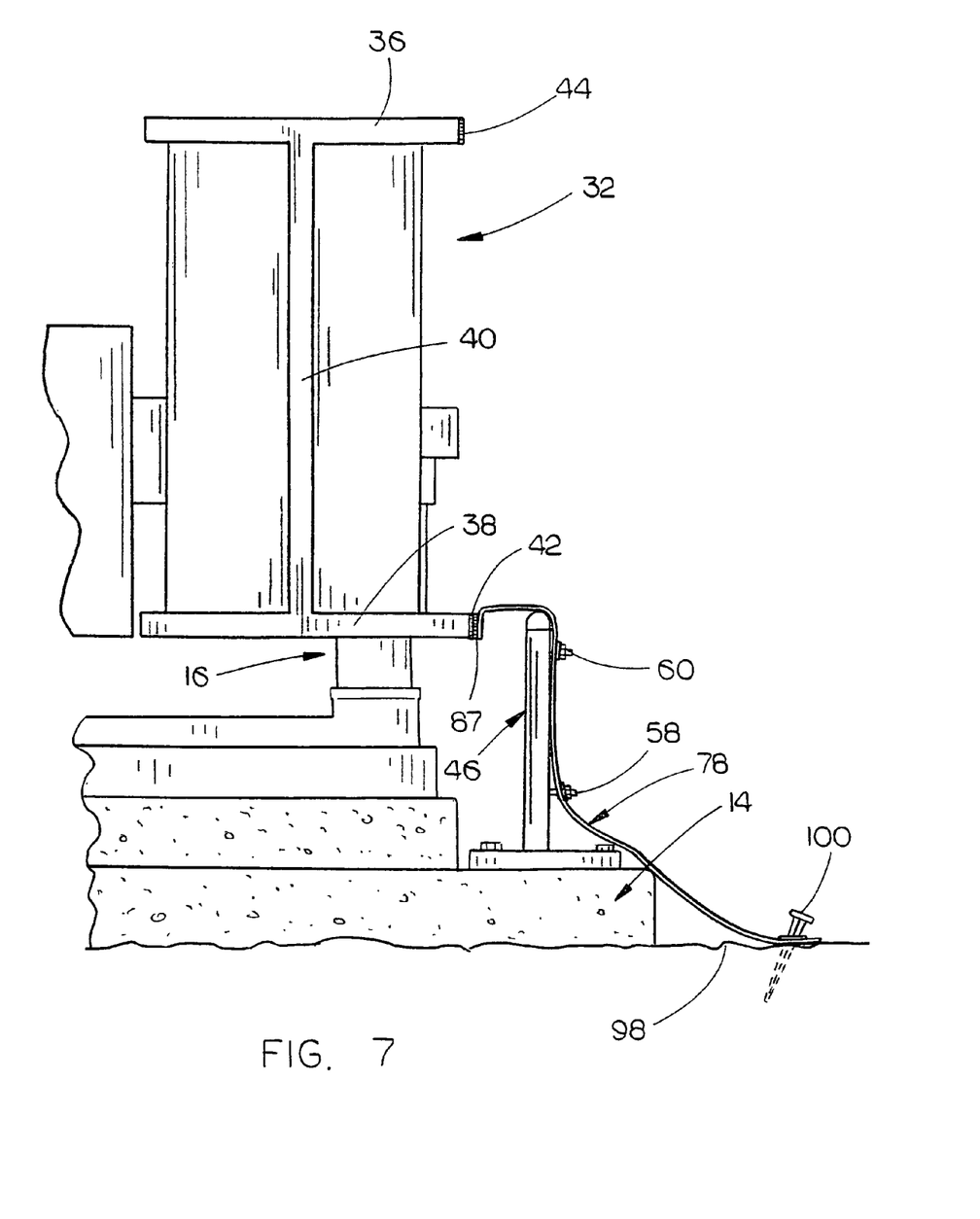
FIG. 7 is a partial end view illustrating the manner in which one of the seals is secured to one side of the truck scale.

The numeral 46 refers to a "short" support post while the numeral 48 refers to a "long" support post. The support post 46 will be utilized when the VELCRO® strip 42 is secured to the outer end of the lower flange 38 while the support post 48 will be utilized when the VELCRO® strip 44 is secured to the outer end of upper flange 36. The only difference between the support post 46 and the support post 48 is the length thereof. In some cases, when the frame siderail of the truck scale 10 has a height of 12 inches, the short support post 46 will be utilized in conjunction with a VELCRO® strip secured to the outer end of the lower flange of the frame siderail, as seen in FIGS. 1 and 7. When the frame siderail has a height of 24 inches, the long support posts 48 will normally be utilized in conjunction with a VELCRO® strip being secured to the outer end of the upper flange of the frame siderail.

Figure 4:
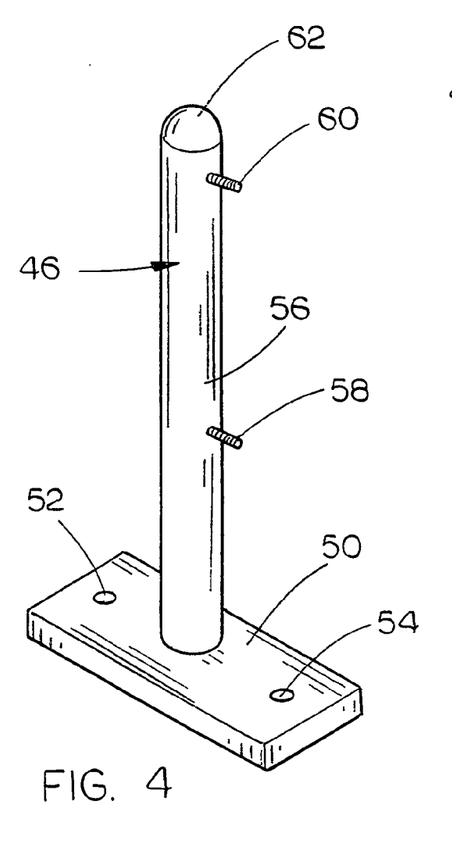
FIG. 4 is a perspective view of one of the support posts of this invention.

Support post 46 includes a base 50 having openings 52 and 54 formed therein. Post portion 56 extends upwardly from base 50 and has a pair of vertically spaced-apart threaded studs 58 and 60 therefrom. Preferably, the upper end of the post portion 62 is rounded.

Figure 5:
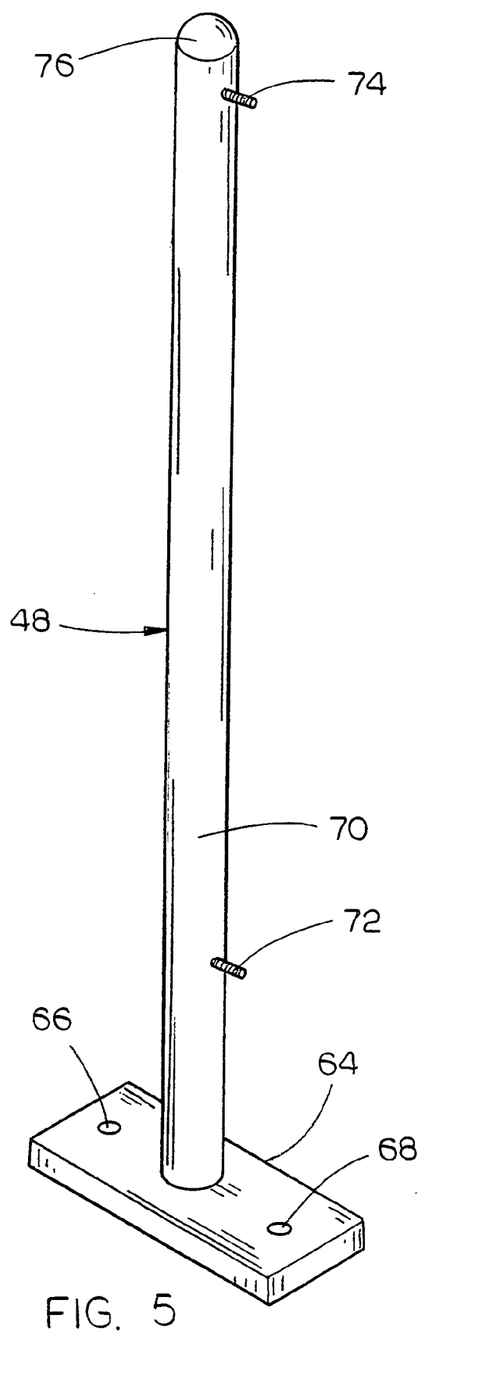
FIG. 5 is a perspective view of another support post of this invention.
Figure 6:
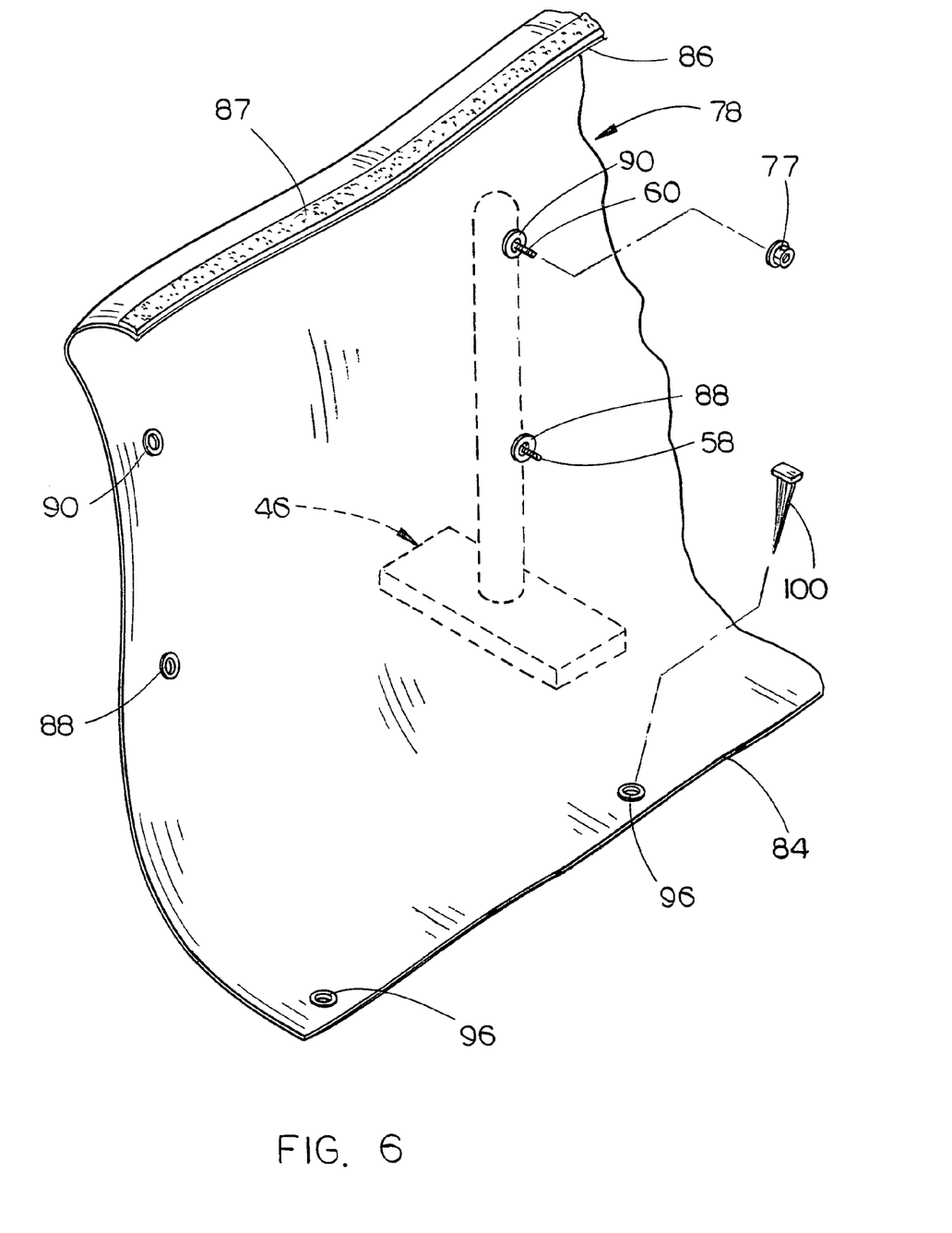
FIG. 6 is a partial perspective view illustrating the manner in which the seal of this invention is secured to one of the support posts.

Support post 48 includes a base 64 having openings 66 and 68 formed therein. Post portion 70 extends upwardly from base 64 and has a pair of vertically spaced-apart threaded studs 72 and 74 extending therefrom. Preferably, the upper end 76 of the post portion 70 is rounded. The studs 58, 60, 72 and 74 are adapted to threadably receive nuts 77 thereon.

Figure 9:
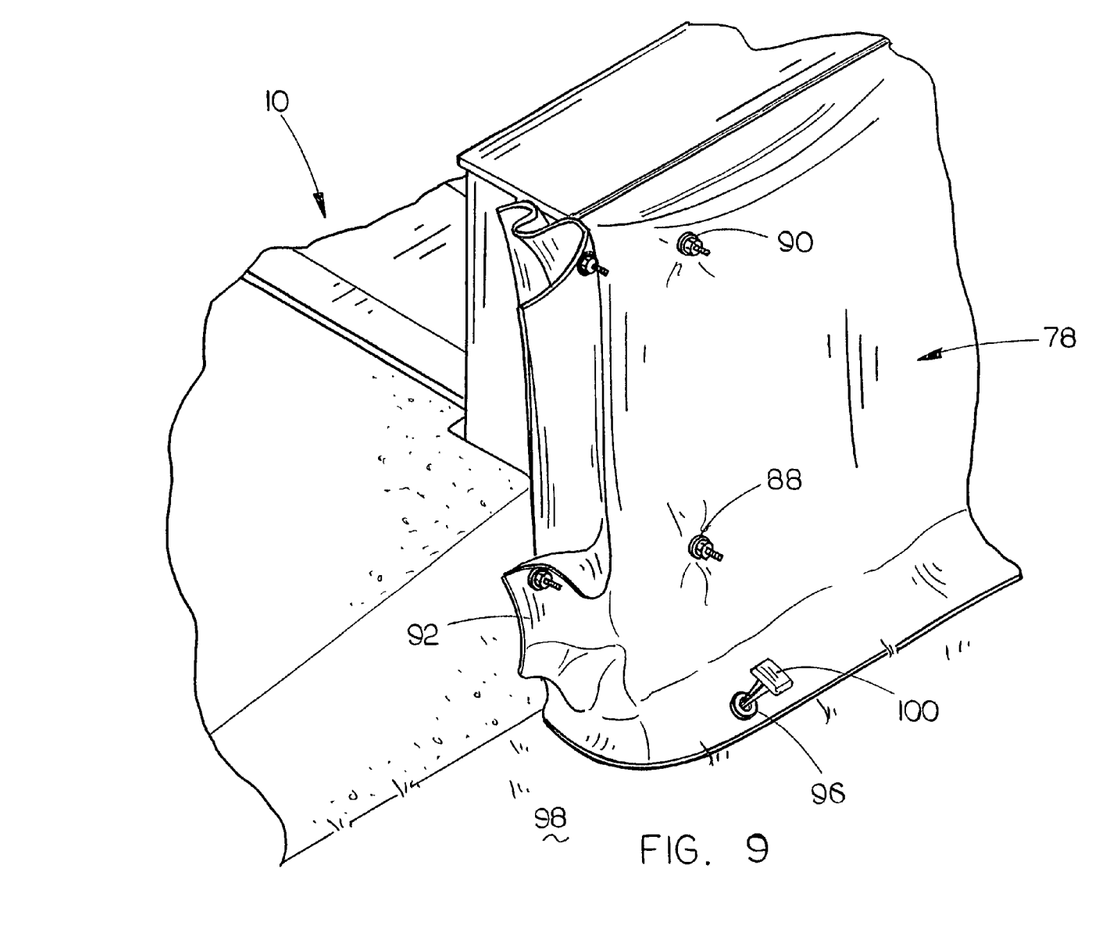
FIG. 9 is a partial perspective view of the embodiment of FIG. 8.

The numeral 78 refers to a generally rectangular, flexible sheet member or seal having ends 80 and 82, a lower edge 84 and an upper edge 86. A VELCRO® strip 87 is provided on the upper end of sheet member 78 for attachment to either the strips 42 or 44. A plurality of pairs of grommets 88 and 90 are provided in sheet member 78 between the ends thereof which are adapted to receive the threaded studs 58 and 60 of the support posts 46 or the threaded studs 72 and 74 of the support posts 48. If the support posts 48 are utilized in conjunction with a 24-inch high side frame rail, the width of the sheet member 78 will be greater than if the posts 46 are being used in conjunction with a side frame rail having a height of 12 inches. Sheet member 78 will be positioned at side 24 of the truck scale 10 and an identical sheet member will be located at the second side 26 of the truck scale. Sheet member 78 includes end flaps 92 and 94 at the ends 80 and 82 thereof respectively which are secured to the ends of the associated frame siderail to close the ends of the gap as seen in FIG. 9. The lower end of the sheet member may have a plurality of spaced-apart grommets 96 provided therein to enable the lower end of sheet member 78 to be secured to the ground 98 adjacent the scale or supporting foundation 14 by stakes 100 as seen in FIG. 9. The lower end of sheet member 78 may also have a loop 102 formed therein which receives an elongated weighted rod 104 to hold the lower end of sheet member 78 in place.

Figure 8:
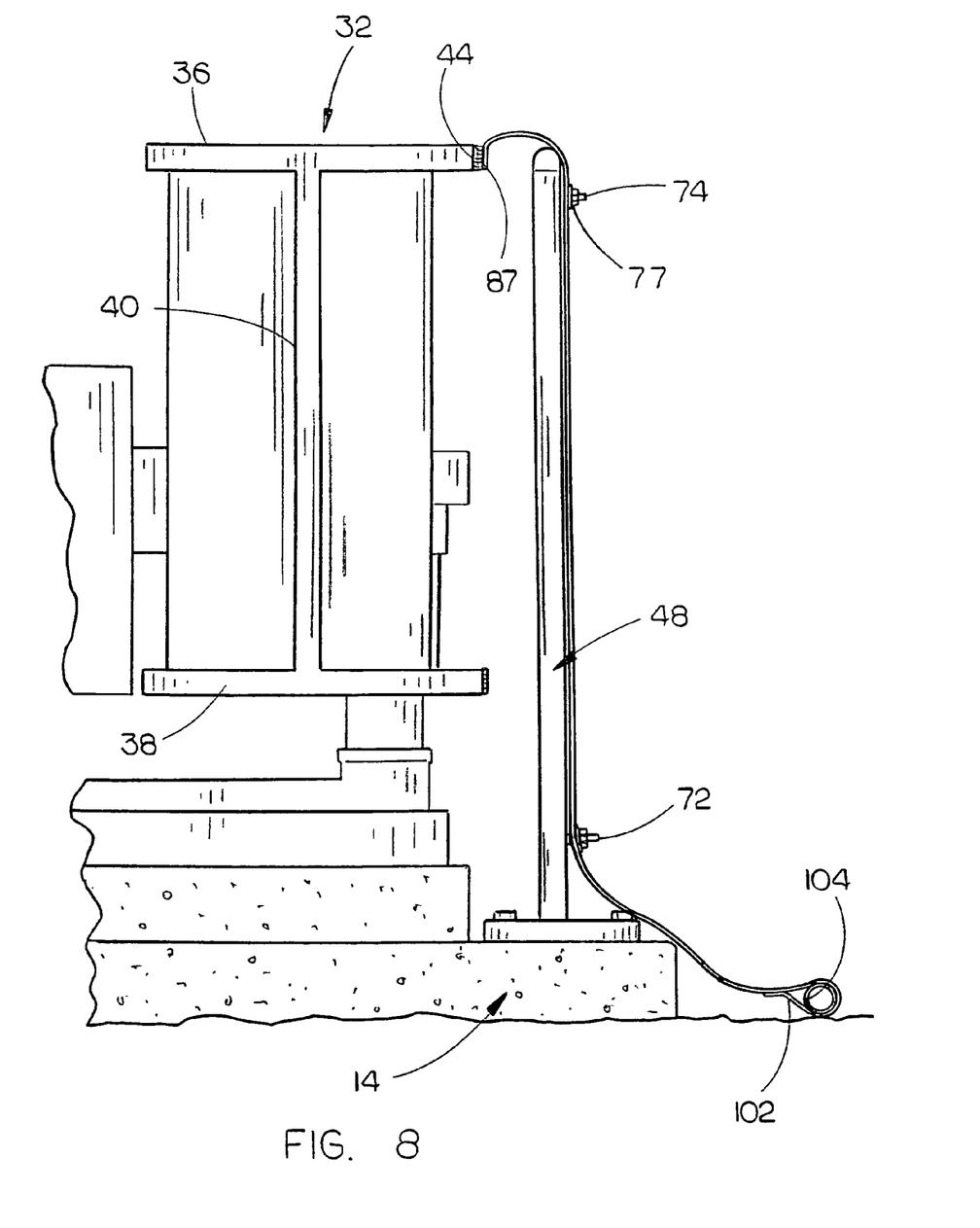
FIG. 8 is a partial end view illustrating a further embodiment of the invention.

The bases of posts 46 and 48 are bolted to the foundation 14 as seen in FIGS. 7 and 8. The posts 46 or 48 support the sheet member 78 in place as seen in the drawings. The sheet member at each side of the truck scale 10 prevents snow from blowing into the scale between the lower end of the scale deck 12 and the foundation 14. The upper areas of the sheet member provide some "play" therein to enable the scale deck 12 to move somewhat in a weighing operation without impeding the accuracy of the scale. The sheet members and the support posts may be removed from the truck scale 10 during non-winter months if so desired.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A truck, scale comprising:
 a substantially horizontally disposed supporting surface, having an entry end, an exit end, a first side and a second side;
 a substantially horizontally disposed scale deck positioned above said supporting surface having an entry end, an exit end, a first side, a second side, an upper end and a lower end;
 a plurality of spaced-apart load cells positioned between said scale deck and said supporting surface;

said lower end of said scale deck being positioned above said supporting surface to create a gap therebetween at each of said first and second sides thereof;

said scale deck having first and second longitudinally extending frame siderails at said first and second sides thereof;

each of said first and second frame siderails having a first end, a second end, inner and outer sides and upper and lower ends;

a first elongated and vertically disposed flexible sheet member having an upper end, a lower end, a first end, a second end, an inner side and an outer side;

said upper end of said first sheet member being secured to said first frame siderail so that said first end thereof is positioned adjacent said first end of said first frame siderail and so that said second end thereof is positioned adjacent said second end of said first frame siderail;

said first sheet member extending downwardly from its said upper end to cover said gap at said first side of said scale deck;

said lower end of said first sheet member being operatively secured in place to prevent snow from moving into said gap at said first side of said scale deck;

a second elongated and vertically disposed flexible sheet member having an upper end, a lower end, a first end, a second end, an inner side and an outer side;

said upper end of said second sheet member being secured to said second frame siderail so that said first end thereof is positioned adjacent said first end of said second frame siderail and so that said second end thereof is positioned adjacent said second end of said second frame siderail;

said second sheet member extending downwardly from its said upper end to cover said gap at said second side of said scale deck;

said lower end of said second sheet member being operatively secured in place to prevent snow from moving into said gap at said second side of said scale deck; and said first and second flexible sheet members permitting said scale deck to move in a weighing operation without impeding the accuracy of the truck scale; and wherein a plurality of horizontally spaced-apart and vertically extending support posts having upper and lower ends, are positioned outwardly of said first and second sides of said first and second frame siderails respectively and wherein said first and second sheet members are selectively removably secured to said support posts.

2. The truck scale of claim 1 wherein said lower ends of said first and second sheet members are selectively removably secured to said supporting surface.

3. The truck scale of claim 1 wherein said lower ends of said first and second sheet members are selectively removably secured to the ground adjacent said supporting surface.

4. The truck scale of claim 1 wherein said upper ends of said first and second sheet members are selectively removably secured to said first and second frame siderails respectively.

5. The truck scale of claim 1 wherein a weight is placed on said lower ends of said first and second sheet members to hold said lower ends of said first and second sheet members in place.

6. The truck scale of claim 1 wherein said first ends of said first and second sheet members are selectively removably secured to said first ends of said first and second frame siderails respectively and wherein said second ends of said first and second sheet members are selectively removably secured to said second ends of said first and second frame siderails respectively.

7. The truck scale of claim 1 wherein said upper ends of said first and second sheet members are secured to said upper ends of said first and second frame siderails respectively.

8. The truck scale of claim 1 wherein said upper ends of said first and second sheet members are secured to said lower ends of said first and second frame siderails respectively.

9. The truck scale of claim 1 wherein each of said first and second frame siderails have an upper flange with inner and outer ends, a lower flange with inner and outer ends, and a web extending therebetween and wherein said upper end of said first sheet member is secured to said outer end of said upper flange of said first frame siderail and wherein said upper end of said second sheet member is secured to said outer end of said upper flange of said second frame siderail.

10. The truck scale of claim 1 wherein each of said first and second frame siderails have an upper flange with inner and outer ends, a lower flange with inner and outer ends, and a web extending therebetween and wherein said upper end of said first sheet member is secured to said outer end of said lower flange of said first frame siderail and wherein said upper end of said second sheet member is secured to said outer end of said lower flange of said second frame siderail.

11. A truck scale comprising:

a substantially horizontally disposed supporting surface, having an entry end, an exit end, a first side and a second side;

a substantially horizontally disposed scale deck positioned above said supporting surface having an entry end, an exit end, a first side, a second side, an upper end and a lower end;

a plurality of spaced-apart load cells positioned between said scale deck and said supporting surface;

said lower end of said scale deck being positioned above said supporting surface to create a gap therebetween at each of said first and second sides thereof;

said scale deck having first and second longitudinally extending frame siderails at said first and second sides thereof;

each of said first and second frame siderails having a first end, a second end, inner and outer sides and upper and lower ends;

a first elongated and vertically disposed flexible sheet member having an upper end, a lower end, a first end, a second end, an inner side and an outer side;

said upper end of said first sheet member being secured to said first frame siderail, at said upper end thereof, so that said first end thereof is positioned adjacent said first end of said first frame siderail and so that said second end thereof is positioned adjacent said second end of said first frame siderail;

said first sheet member extending downwardly from its said upper end to shield said first side of said scale deck;

said lower end of said first sheet member being operatively secured in place below said lower end of said first side of said scale deck;

a second elongated and vertically disposed flexible sheet member having an upper end, a lower end, a first end, a second end, an inner side and an outer side;

said upper end of said second sheet member being secured to said second frame siderail, at said upper end thereof, so that said first end thereof is positioned adjacent said first end of said second frame siderail and so that said second end thereof is positioned adjacent said second end of said second frame siderail;

said second sheet member extending downwardly from its said upper end to shield said second side of said scale deck;

said lower end of said second sheet member being operatively secured in place below said lower end of said second side of said scale deck, and said first and second flexible sheet members permitting said scale deck to move in a weighing operation without impeding the accuracy of the truck scale; and wherein a plurality of horizontally spaced-apart and vertically extending support posts having upper and lower ends, are positioned outwardly of said first and second sides of said first and second frame siderails respectively and wherein said first and second sheet members are selectively removably secured to said support posts.

12. The truck scale of claim 11 wherein said lower ends of said first and second sheet members are selectively removably secured to the ground adjacent said supporting surface.

13. The truck scale of claim 11 wherein said upper ends of said first and second sheet members are selectively removably secured to said first and second frame siderails respectively.

14. The truck scale of claim 11 wherein each of said first and second frame siderails have an upper flange with inner and outer ends, a lower flange with inner and outer ends, and a web extending therebetween and wherein said upper end of said first sheet member is secured to said outer end of said upper flange of said first frame siderail and wherein said upper end of said second sheet member is secured to said outer end of said upper flange of said second frame siderail.

* * * * *